(12) United States Patent
Chino et al.

(10) Patent No.: US 10,769,176 B2
(45) Date of Patent: Sep. 8, 2020

(54) METHOD AND APPARATUS FOR CREATING AND CURATING USER COLLECTIONS FOR NETWORK SEARCH

(71) Applicants: Richard Chino, Pasadena, CA (US); Joshua Metzger, Beverly Hills, CA (US); Scott Snell, Beverly Hills, CA (US)

(72) Inventors: Richard Chino, Pasadena, CA (US); Joshua Metzger, Beverly Hills, CA (US); Scott Snell, Beverly Hills, CA (US)

(73) Assignees: Richard Chino, Beverly Hills, CA (US); Joshua Metzger, Beverly Hills, CA (US)

( * ) Notice: Subject to any disclaimer, the term of this patent is extended or adjusted under 35 U.S.C. 154(b) by 148 days.

(21) Appl. No.: 14/744,346

(22) Filed: Jun. 19, 2015

(65) Prior Publication Data

US 2016/0371361 A1     Dec. 22, 2016

(51) Int. Cl.
| | |
|---|---|
| *G06F 16/00* | (2019.01) |
| *G06F 16/28* | (2019.01) |
| *G06Q 30/02* | (2012.01) |
| *G06F 40/134* | (2020.01) |

(52) U.S. Cl.
CPC .......... *G06F 16/285* (2019.01); *G06F 40/134* (2020.01); *G06Q 30/0242* (2013.01); *G06Q 30/0275* (2013.01)

(58) Field of Classification Search
CPC ......... G06F 17/30864; G06F 17/30528; G06F 17/30023; G06F 17/30598; G06F 17/2234; G06F 16/285; G06F 17/2235; G06Q 30/0242; G06Q 30/0275
USPC ................................ 707/722, 735; 705/26.8
See application file for complete search history.

(56) References Cited

U.S. PATENT DOCUMENTS

| | | | |
|---|---|---|---|
| 7,043,471 B2* | 5/2006 | Cheung | G06Q 30/02 |
| 7,065,500 B2* | 6/2006 | Singh | G06F 17/30864 |
| | | | 705/20 |
| 7,076,479 B1* | 7/2006 | Cheung | G06Q 30/02 |
| | | | 707/735 |
| 7,093,012 B2* | 8/2006 | Olstad | G06F 16/951 |
| | | | 709/224 |
| 7,603,294 B2* | 10/2009 | Singh | G06F 17/30864 |
| | | | 705/14.71 |
| 8,616,896 B2* | 12/2013 | Lennox | G06F 17/30598 |
| | | | 434/118 |
| 9,418,050 B1* | 8/2016 | Brewster | G06F 17/30876 |
| 9,436,754 B1* | 9/2016 | Hu | G06F 17/30997 |
| 2005/0239551 A1* | 10/2005 | Griswold | A63F 13/12 |
| | | | 463/42 |
| 2007/0067297 A1* | 3/2007 | Kublickis | G06Q 30/02 |

(Continued)

FOREIGN PATENT DOCUMENTS

GB     2383862 A *  7/2003     ............ G06Q 30/08

*Primary Examiner* — Monica M Pyo
(74) *Attorney, Agent, or Firm* — Brinks Gilson & Lione

(57) ABSTRACT

A media system that is accessible over a network, which includes a user interface module implemented by a server computer and accessible by a plurality of user computers operated by a plurality of users over the network and is operative to respond to user requests for web pages or other selections of content, where user inputs of one or more collections can be obtained.

15 Claims, 7 Drawing Sheets

(56) References Cited

U.S. PATENT DOCUMENTS

| | | | |
|---|---|---|---|
| 2012/0246578 A1* | 9/2012 | Baldwin | G06Q 50/01 715/753 |
| 2014/0103024 A1* | 4/2014 | Kobayashi | F27B 17/0025 219/402 |
| 2015/0134688 A1* | 5/2015 | Jing | G06F 17/30277 707/766 |
| 2015/0227890 A1* | 8/2015 | Bednarek | G06Q 10/08355 705/26.81 |
| 2015/0228004 A1* | 8/2015 | Bednarek | G06Q 30/0633 705/26.8 |

* cited by examiner

METHOD AND APPARATUS FOR CREATING AND CURATING USER COLLECTIONS FOR NETWORK SEARCH

RELATED APPLICATION

The present application claims priority to U.S. Provisional Patent Application No. 62/017,644, filed Jun. 26, 2014, the entirety of which is hereby incorporated by reference.

BACKGROUND

1. Field of the Invention

The present disclosure relates to a method and system for enabling a user to create a destination of his/her ideas, research, recommendations, interests, and/or other content in a collection, which may be submitted to a database, where, among other things, such collection can be accessed, analyzed, modified, optimized, or shared by such user and/or other users of the system (or the system) in response to a search query, or who otherwise browse and find such collections. The present disclosure also relates to a method and system of evaluating the merit and relevancy of any such collection as it pertains to an individual search, various keywords or tags, and/or to the system as a whole, as well as a method and system that can recognize the intent of the user when submitting a search query via the browser or application, then sent to a server, returning a relevant set of results in response to that specific query. The present disclosure also relates to a method and system of analyzing the content and associated content of any such collection and relating such content to other collections as determined by any such analysis and enabling the association of such content. The present disclosure also pertains to a method and system of monetization that quantifies future activity with a discounted present value to introduce option pricing into the advertising marketplace. The present disclosure also pertains to a method and system of optimizing monetization for users who create collections, as well as enabling such users to submit requests via the browser or application to a server to select the advertising location and market participants within their collections. The present disclosure also pertains to a method and system of monetization that qualifies a commercial or other reward type event with a prior act of human intervention (at the browser or application) to more adequately associate the commercial event with a human being and/or intent. The present disclosure also pertains to a type of monetization that can be presented to users in the form of incentives or discounts in addition and alternatively to receiving cash for any relevant transaction.

2. Description of the Related Art

Search is one of the most widely used utilities on the Internet. People use search engines to find, among other things, news and information to read and follow, content to be entertained, and products and services to purchase. A search user will type in a word or a series of words and the search engine will return a set of results from its database that it determines are relevant to the search query.

Search engines populate their databases of search results by scouring the web using robotic crawls that parse data and return content that can be formatted into a search result. The search engine matches the content to certain words. For example a website about baseball would show in up a search query for "baseball" but would not show up in a search results for "thirteenth century European leaders."

Search results displayed to a user are generally composed of a title and a description. The title is in the neighborhood of forty characters and the description is approximately one hundred and fifty characters. Those numbers have been adjusted from time to time. The title and the description are each generated by the technology of the search engine company, using data they obtain from the corresponding web site. Additional elements about the search listing, such as metadata, impressions, clicks, etc. are stored by the search engine company.

In addition to these search results (referred to often as algorithmic results) advertisers can pay to create their own search listings, composed of a title and description (and in some instances, a price per click the advertiser is willing to pay, although that may or may not be displayed to the user). These listings can be presented alongside algorithmic results or above or within the algorithmic results. These results are often referred to as "paid listings."

The presence of an algorithmic result, and its ranking in the results, are determined by the algorithm of the search engine company as well as by webmasters and search engine optimizers who work diligently to maximize their respective sites or clients' sites ranking in the results by best understanding the algorithm of the search engine. If a user believes a certain result should be in the rankings or be the number one ranking for a query, they have no voice or ability to make that happen.

Results are returned in response to a query even though the search engine may have no idea who the user is at that moment in time. It is impossible for current search engines to fully understand and predict with perfect accuracy the intent of a user. A search engine can make assumptions that the person searching is the same person who used their product previously but in many cases, for example, in families where one computer or device is used by multiple people, it is challenging to truly discern intent. For example, a father may search for search results on "Paris" because he is interested in a vacation, while his school-age daughter may search for search results on "Paris" because she is doing a research project for school. The same problem can occur even if a single user searches on a computer or other device. Someone may search for "telescope" because they are interested in purchasing one, or because they want to learn how it is made. Depending on intent, a different set of search results should be presented but the search engine has no way of discerning intent based solely on a query. This is true even if a user is signed in with the search engine, as there can still be multiple users per account or different intentions with respect to the same search query.

Many search engines monetize their service with a cost per click business model. That is, advertisers pay the service every time there is a click on a paid listing that the advertiser has submitted to the service. However, it has recently been reported that many of these clicks are fraudulent and initiated by computers. Advertisers are paying for clicks that are not generated by potential customers.

Accordingly, a method and system are needed in this field to empower users to create a set of results that can be grouped into a collection. The collection (or portions thereof) can then be assigned (by the content creator, the system and/or other users of the system) to one or more keywords so that such collection can appear when a user searches using that keyword. In another embodiment of the disclosure a collection can then be assigned (by the content creator, the system and/or other users of the system) tags and/or additional keywords to reflect the collection's association (or disassociation) with other collections, other keywords, other tags, etc. In addition, a method and system are needed that can recognize the intent of the user when submitting a search query and return from the server a relevant set of results in response to that specific query. In addition, a method and system are needed that can evaluate the quality of a click received by the server and determine whether a human being is the initiator of that click so as to reward and charge different participants in the system (including but not limited to users, content creators and advertisers) accordingly. In addition, a method and system are needed that quantifies future activity on the system with a discounted present value to introduce option pricing into the advertising marketplace as well as enable users who create collections to share in revenue earned from activity associated with the users' collections or content, optimized by the system, and for the system to enable users to select how and where such revenue opportunities should occur (and with which market participant). In addition, a method and system are needed for a type of monetization that can be presented to users in the form of incentives or discounts in addition and alternatively to receiving cash for any relevant transaction.

SUMMARY

The present disclosure provides embodiments of a method and system for (i) enabling a user to create a collection of content (which he aggregates and finds via different means) and manage that content privately or make it available in a database of potential results for a search query; (ii) prescribing different keywords (or tags) to such collections, in addition to (or instead of) the initial keyword(s) (and/or tags) inputted by the content creator; (iii) presenting the appropriate set of results in response to a query by discerning user intent; (iv) analyzing content and associating such content with other content based on various sets of data, and weighing the strength of such association to determine relevance and prominence of such content; (v) enabling the association of any content or collection or piece of pieces of content (e.g. an image or a listing or a video for example) with any other content or collection or piece or pieces of content (e.g. another link or a listing or an image or another video or example) based on different criteria; (vi) collaborating with other users on the collection creation and editing process and/or enabling all users to participate in a dynamic process to create, edit, modify, or otherwise influence collections, content, and/or their relevance; (vii) allowing users who search to select from these results based on their intent, demographics, location, expertise, and other affiliations; (viii) qualifying the quality and/or intent of a click to more effectively distribute costs and fees and rewards or other metrics throughout the system to various participants; and (ix) establishing a marketplace that allows for option pricing of advertising inventory as well as enabling users who create collections to control where third-party units are placed within the collection, who can place those units and what the desired revenue structure should be for those opportunities.

DETAILED DESCRIPTION OF THE PREFERRED EMBODIMENTS

Content Creation

Type of Content

The creation of content can mean many things. In one embodiment of the disclosure, content is a collection of text links. In another embodiment of the disclosure, content is free text combined with text links. In still another embodiment of the disclosure content is just images (or a link to an image). In yet another embodiment of the disclosure, the content forming the collection is just audio (or a link to audio). In another embodiment of the disclosure the content is just video (or a link to a video). In another embodiment of the disclosure the content may include summaries and links of other collections. Additional embodiments of the disclosure are mixed media collections composed of a combination of any or all of text links, free text, audio, images and video. In each instance above, content is created in its original form, as a link, and/or as a more comprehensive listing that may include a title and or description about that link.

Means to Create and/or Find Content

Figure 1:
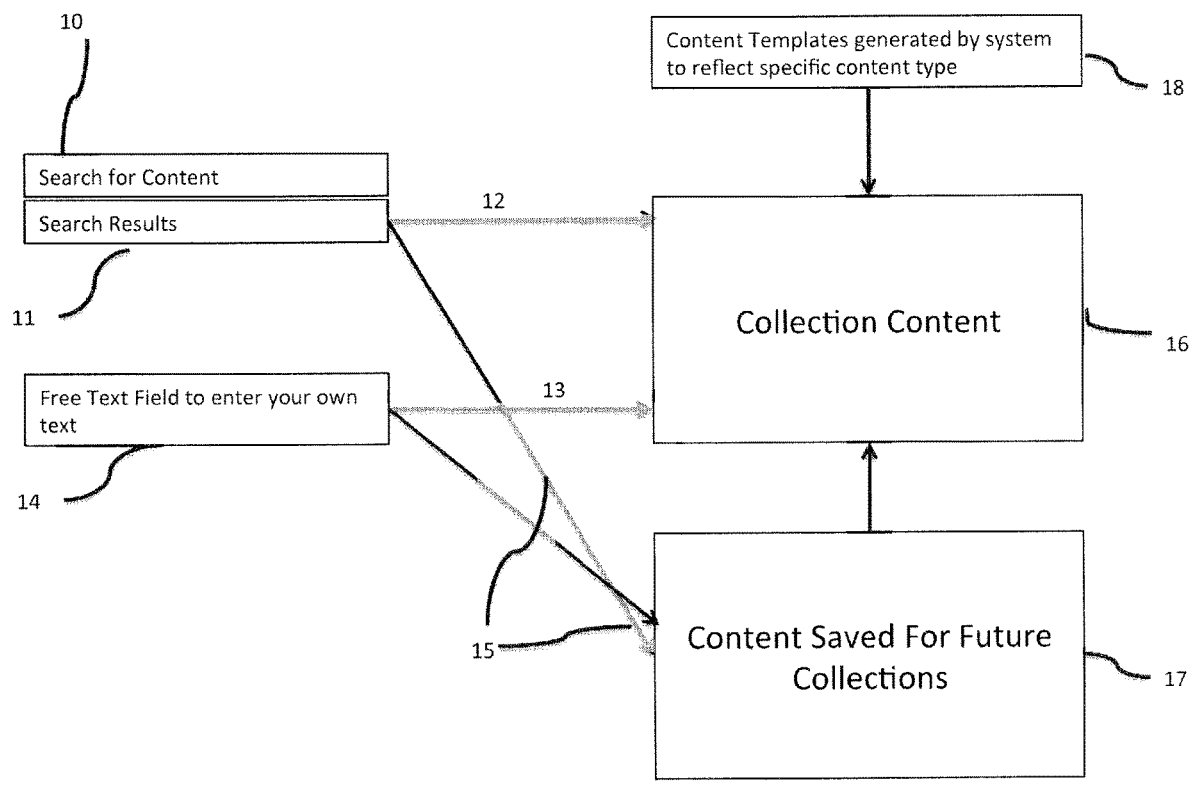
FIG. 1 illustrates an example of how a user would make a collection.

Referring to FIG. 1, text links can be obtained by conducting a query on our service (either publicly or within a user profile) via a browser, application or other interface to a server, 10 and having the server return results comprised of text links 11 and adding certain of those links to a set of results. 12 Text links can also be obtained by selecting the plus button (or equivalent) next to a listing on another person's collection. In another embodiment of the disclosure, audio, images and video (or links to video) can be added to a potential collection or collection as well. Users have the ability to search for audio, images and video in a similar manner to how they search for text links (on our system using publicly available search and other utilities or when logged in to our system using privately available search and other utilities) and add those resulting media to a new and/or existing collection. In another embodiment of the disclosure, a user can choose to input free text as part of a collection. 13 Free text can be added by inputting words into a text box. 14 This resource is available if you have a fact or opinion or story that you want to share, or want to add context to the text links and video you have included in your collection. Text is submitted via a browser, application or other interface to a server. Free text, or any result, can be added instantly into a collection or stored for a collection to be created at a future time. 15 Once a user has selected a text link (or audio, images and/or video or free text) for potential inclusion in a collection, the user can then instantly create that collection (by combining such link with other links or content) or store such text link (or other type of content) 16 in the user's profile. 17

A Collection

Figure 2:
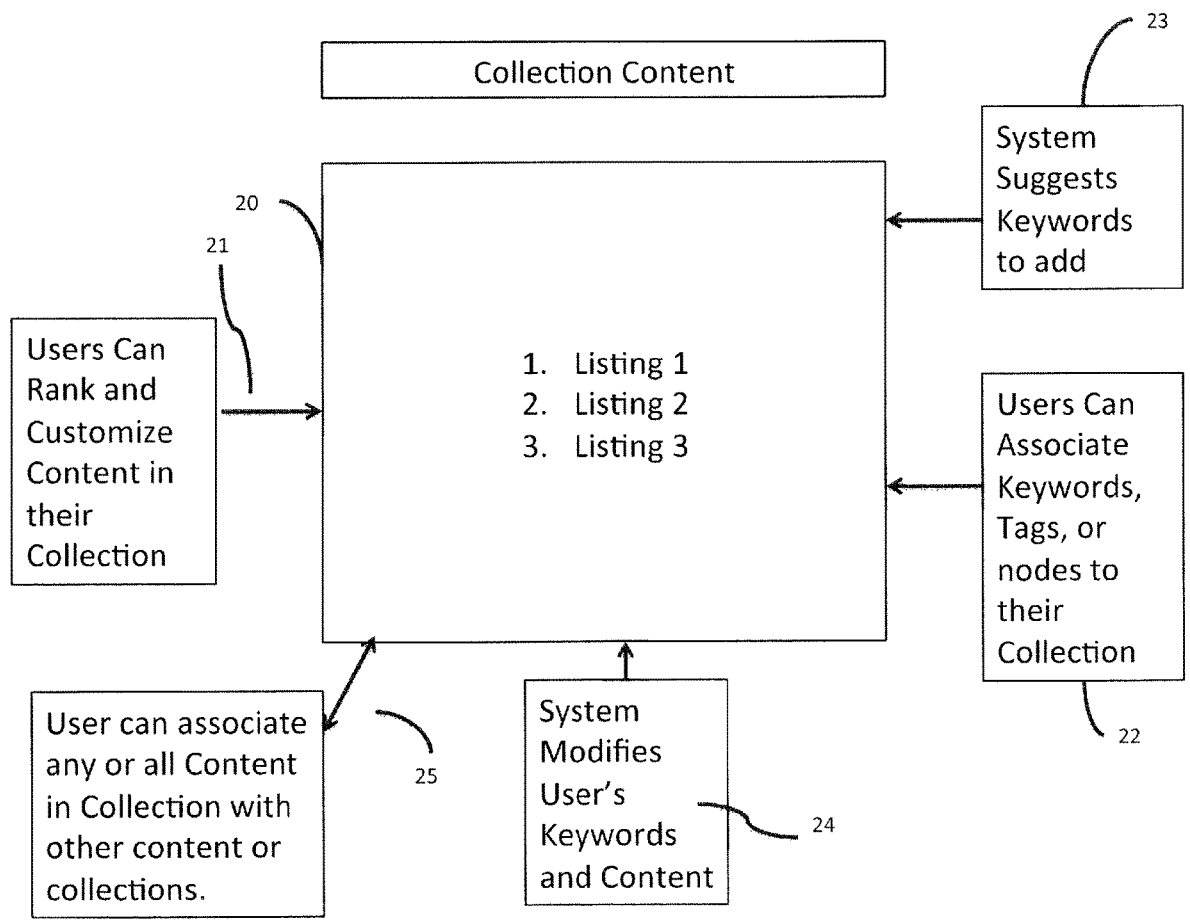
FIG. 2 illustrates an example of the different ways users and the system interact with a collection to help self-identify it before and after publication

Referring to FIG. 2, once a group of content is grouped together, the user then ranks the individual links (and/or content) in order of preference by that user. 20 The content is associated with a tag or node, or what can also be called a keyword, which can be one or many words. 21 In one embodiment of the disclosure, the user can add a title and description that applies to the entire grouping. We call this a collection.

Means for Finding Content for Later Use

Figure 3:
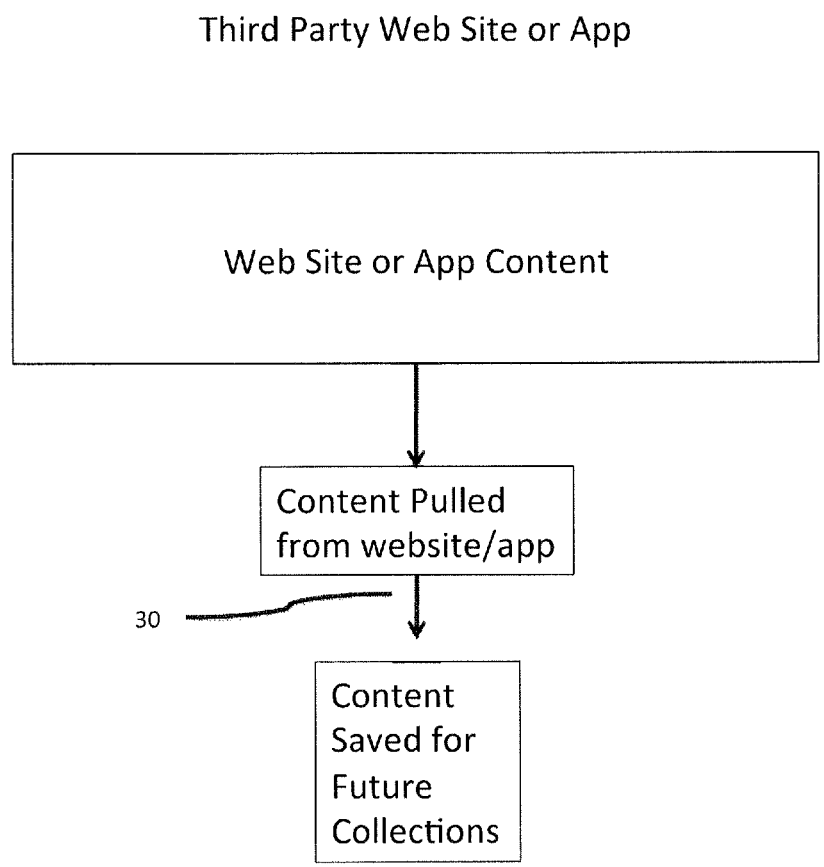
FIG. 3 illustrates an example of how users can capture information for future collections while on other websites or applications of third parties.

Referring to FIG. 3, in another embodiment of the disclosure, users will be able to add text links, audio, images, and/or video to their profile while browsing and visiting other physical locations, digital media properties and web sites. 30 These various media remain stored in a user's profile on the server, from which they can be accessed and used later when creating a collection. 17 A user can store such content on the server in his/her profile by adding it at any time and from any device whether the user is on our system or visiting another web or mobile site or just merely wishes to freely add content while otherwise connected or not connected. Any or all of these links or listings or content will be stored 17 and can be subsequently or immediately reviewed and curated for inclusion into a set of results that can become a collection. 16 In another embodiment of the disclosure, any or all of these links, listings or content can be stored and subsequently searched on when a user desires to create a collection at a later date. In another embodiment of the disclosure, a user can provide tags via a browser, application or other interface to a server, to filter and organize the content aggregated in his/her profile. Based on those tags, a user will be able to view and/or access the content in any number of ways depending on the user's selection. A user can then freely associate his/her content by a single or multiple variables.

Modifying Existing Content/Collections

In another embodiment of the disclosure, a user creating a collection can take existing listings (found in other collections or otherwise) and modify the content in such listings to create his/her own modified listing. A user may do this if he/she thinks the listing is a quality listing but the title and description could be modified to improve its visibility or click thru rate or for any other reason.

Content Templates

In another embodiment of the disclosure, the system can provide different content templates for different types of collections. 18 A user, via a browser, interface, application or otherwise, may request from the server a content template that corresponds to the type of collection they wish to construct. Such templates can be based on the type of content provided in the collection and/or the tags or keywords associated with the collection. In another embodiment of the disclosure, a template can be provided by the server for specific time-based events, enabling a content creator to curate a page at the browser, application or other interface, for an event that can include content to purchase tickets, QR codes to obtain more information or redeem coupons or tickets.

Public/Private Collections

In another embodiment of the disclosure, collections can be designated as public or private or anonymous. When a user aggregates content into a collection the user can decide to not share that collection on the public database. These private collections are reserved for the user's own use. If a user is doing a term paper on the "Louisiana Purchase" he/she can gather all listings and content in a private collection under the tag/keyword "Louisiana Purchase." At any point in time, the user can change that private collection to a public collection so if another user were to search on, among other things, "Louisiana Purchase" this previously private collection may appear in the results displayed from the server.

In another embodiment of the disclosure, a user can also make a collection anonymous. If a user wants a collection to be included in the searchable public database but does not wish to attach his/her profile to that collection, he/she can tag that collection as anonymous. The data emanating from viewing and interacting with such collection will be viewable by the user in his/her dashboard on his/her profile but another user who sees such a collection will not be able to associate that collection with anyone.

Content Publications Process

In another embodiment of the disclosure, content/collections are not incorporated into the search service until they are deemed acceptable by the user community. When a user creates content/collections via a browser, interface, application or otherwise and submits such content/collection, that content/collection will initially be stored separately on the server, apart from publicly accessible search results, and will be presented to a segment of the user population who will be aware that this content/collection is not yet included in our search database. If this segment of users determines that the content/collection is inappropriate (e.g. the content/collection includes content that does not comply with our terms of service) they submit their feedback to the server (via a browser, application or other interface to a server) and the system will evaluate the feedback and, if warranted, notify the user who created that content/collection and give him/her a chance to modify the content/collection. The content/collection will not appear in our search results until a qualified number of users have signaled their approval. The system will engage in real-time analysis of the feedback and the source of the feedback, enabling a content/collection to be published to the search service as quickly as the system permits. This supports the system by enabling real-time feedback of new content/collections, and protects the integrity of the system by providing a holding pattern for new content/collections to prevent inappropriate content or content that otherwise does not comply with our terms of service from appearing on our services. Further, in another embodiment of the disclosure, the system can also discern between content/collections created by users who have previously produced content/collections and who have attained a level of approval and value score within our service to enable those users to bypass this process for new collections or for modifications to existing collections with new content. This will be an ongoing dynamic analysis to insure fresh, relevant content but also enable a process to give users an incentive to bypass an approval process.

Content Association

Keyword Association

In another embodiment of the disclosure, a user can associate his/her collection with a keyword or multiple keywords. 22 In another embodiment of the disclosure, the system can also suggest additional keywords to which the collection is relevant. 23 The system can also modify keywords submitted by the user and make additional suggestions regarding the title, description to insure it conforms to the collection. 24 The system can also generate suggestions or modifications to any or all of the content created or submitted by the user and present such modifications automatically to another user with or without informing the content creator. 24

When content is aggregated by a user via a browser, interface, application or otherwise, into a collection 20, in addition to identifying the content with a keyword or multiple keywords, a user can make a determination about the association of an individual piece of content or multiple pieces of content in such collection with any other content (whether part of another collection belonging to that user or any other user). 25 No single listing or collection has any limitations regarding association or with being part of any number of collections. A listing or piece of content can appear in response to multiple keywords and in multiple collections of a single user.

Algorithmic Matching

In another embodiment of the disclosure, the system will match the intent of the user who created a collection by analyzing the word(s) the collector has in his collection. The system may treat content that the user has typed in him/herself differently than content the user has incorporated from other services (or content within images or videos or listings or their metadata or other types of results). The algorithm measures content in different modules within a collection and attaches different weight for purposes of determining relevancy. A word or series of words in a headline or description of a collection might have greater weight than the same word appearing in a listing. Similarly, a word or words manually inputted by the creator of the collection may carry greater weight than system generated content (depending on the association of such word(s) with other words within the collection). The system will analyze the words selected, and its value and weight will be incorporated into the scoring system as well, as a component to weigh when evaluating the relative strength of a collection and its appropriate placement on a page (e.g. is it relevant to the search query) and/or within a page (e.g. is the collection more/less relevant than other content/collections on the page). In another embodiment of the disclosure, the system may provide alternate designations for collections of content. A user creating a collection may designate such collection as best suited for a certain user, category or demographic (e.g. men 18-24) However, after the collection is accessible by users, the system may determine, based on data it collects from queries and otherwise, that the collection is best suited for a different user, category or demographic (e.g. married women age 34-39) The system may modify the designation selected by the user to reflect its more appropriate target, deleting the original designation.

Figure 4:
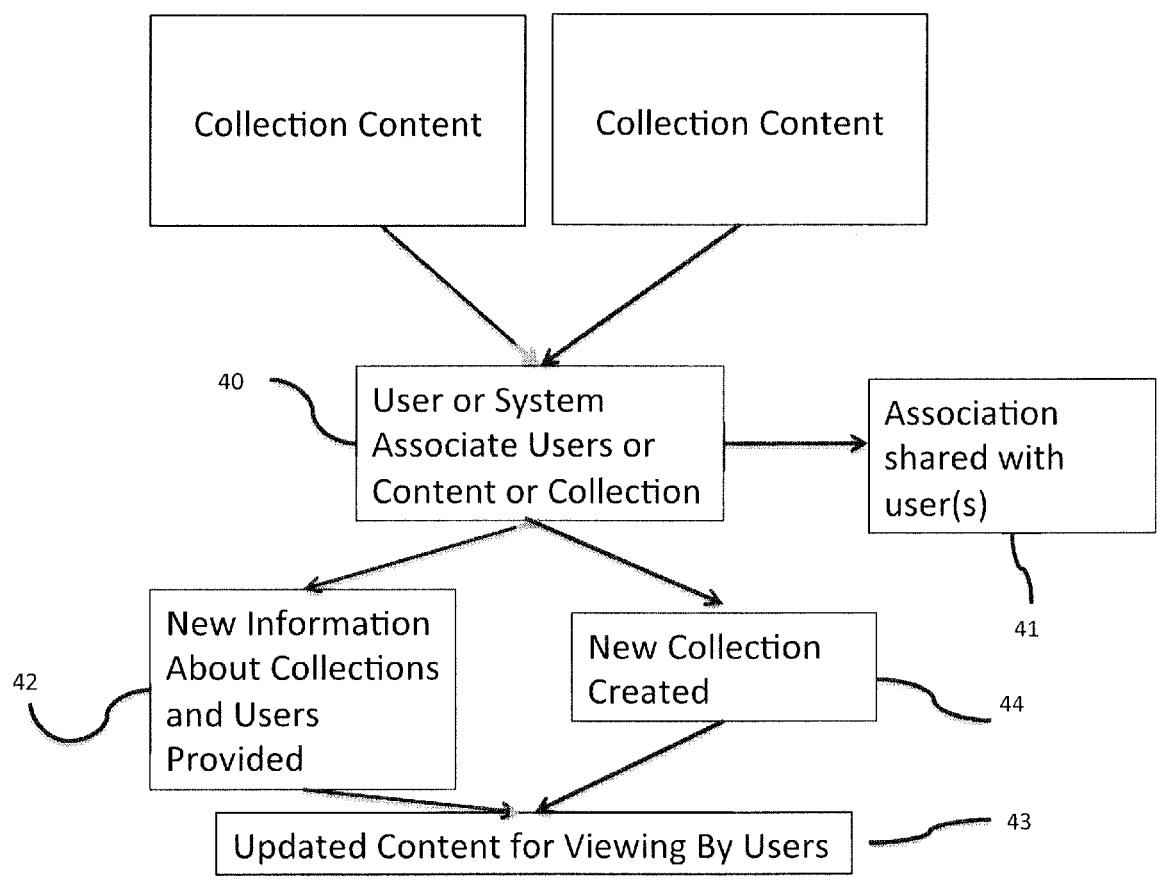
FIG. 4 illustrates an example of how the users or the system interact and relate multiple collections, users and content.

Association with Other Users and Portions of Others Users' Collections by Different Users and by the System Referring to FIG. 4, in another embodiment of the disclosure, the user can associate content he has created or aggregated with other users that have collections with similar content. 40 For example, if user one has created a collection regarding European Travel, and user two (or user n) separately creates a collection for European Travel, and their collections are subsequently associated (by user one, user two, user n, or a different user searching or by the system), 40 user one can subsequently look at all other pieces of content that have been created by user two, including but not limited to, European Travel and associate some, all or none of his other collections with user two's. This subsequent association will inform each of user one and user two (and the system) about their association of all of the content and collections they create 41 but will also provide the system information 42 that can inform user three to user n who land on a collection page belonging to user one, 43 which can lead to user n browsing all of user two's collections. User one can also make more restrictive decisions about user two's collections and only associate specific listings within user two's collections. In each of the above examples, the reverse is also true in that user two (to user n) can make those decisions about user one.

The ability of associating content and collections is dynamic and persistent and is available to everyone in the system. User one can associate a single piece of content in a collection or an entire collection with user two. User two may agree or disagree with that association and take subsequent action. 40 User n, searching and arriving at user one's collection may separately decide that user two's collection should be associated with user one's collection for that particular keyword or for another keyword. 40 Separately the system can determine whether user one and user two's collection or content within a collection can be associated depending on independent actions taken by separate users who may share common interests or demographics. 40 This ongoing association enables the system to continuously update and make fresh collections 44 or set of results 43 available to the searcher depending on both the interests of the searcher and the relevance and quality of the collection.

In addition to user one having the ability to associate any or all of his content or collections with user two (to user n), user one can identify the association of the related content. User one may decide that only the second listing under European Travel should be associated with one or more of user two's listings and that association is then assigned a tag, or keyword. For example, user one may have 3 listings under European Travel that relate to "fine dining" and user two may have one listing associated with "fine dining." User one can make that tag and association for just those listings. Consequently, a new collection is created for the new keyword "European Travel fine dining" (or just "fine dining" or some other keyword selected by the user) comprised of the new set of listings selected by user one.

User one can also associate all of his content with user two (and/or user n). 40 Alternatively, in another embodiment of the disclosure, the system may associate user one with user two. 40 This association will enable a new searcher to see user one's collections, see an association with user two and make his/her own determination about the validity of the association for not just European Travel but for all collections created by both user one and user two. Effectively, such association and the depth of that association empowers searchers to evaluate the content and the merit of the content in each collection.

In another embodiment of the disclosure, tagging and associating content is not just limited to the content creators. A user conducting a search query can initiate his/her own associations. By enabling everyone to associate listings or collections with additional keywords, a whole new set of search listings is created. 44

Figure 5:
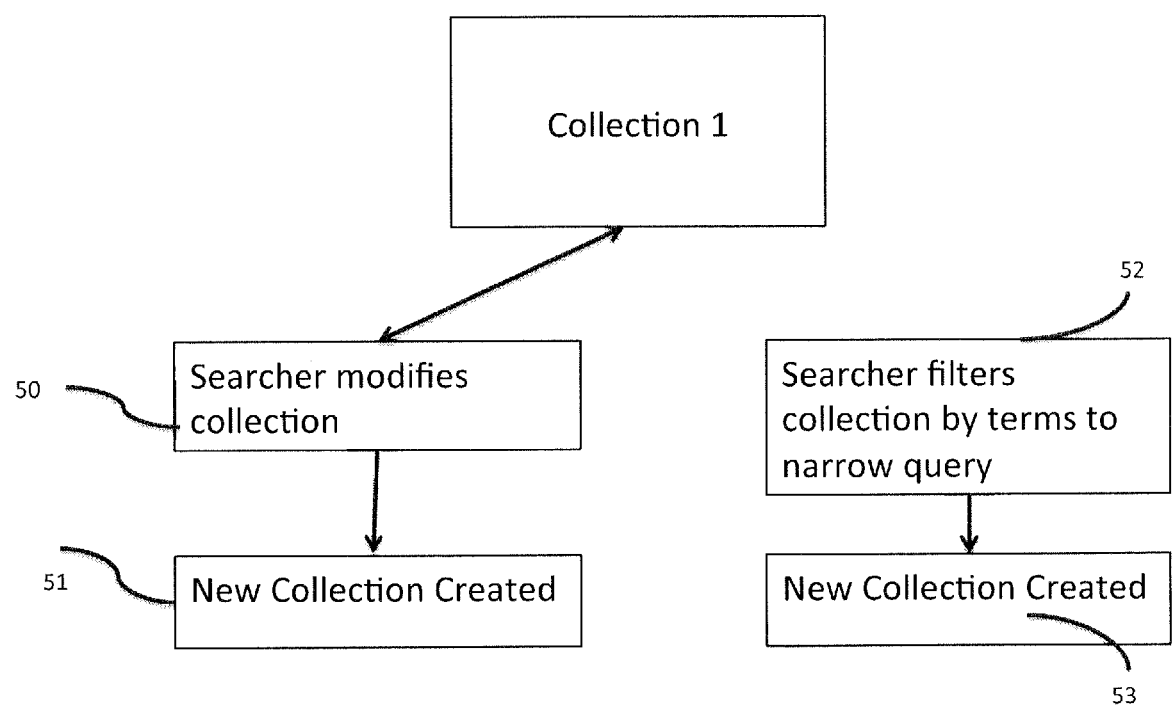
FIG. 5 illustrates an example of how people searching on the system can create new content by interacting with a collection or filtering the variables associated with that collection.

Referring to FIG. 5, in another embodiment of the disclosure, the searcher can view a collection and decide she wants to make her own collection based on the same keyword. She can add certain of the results in the collection she is viewing or she can opine on the existing collection (via a browser, application or other interface). She can add keywords or tags to the existing collection, which instantly classifies the existing collection as an additional collection. 50 For example, if she is viewing a collection on European Travel and tags that as budget, the collection may then appear under a new keyword search, "European Travel Budget" 51 and its presence in those results will be dependent on a number of factors as discussed below. As a result of this capability, the database of results is very dynamic, the server is updated in real-time to reflect the most recent additions to the results sets as provided by users. Each association and action made by a user creates a potential new set of results and the prominence of that resulting collection will depend on many variables (as detailed below) including to what degree users associate that content with what keywords.

Crowd Sourcing

Another embodiment of the disclosure is the ability to crowd source and map a collection. Collections can be crowd sourced (collaborated on) by a common word (e.g. fine dining) and can also be crowd sourced by demographics (or common interests, friends, common collection or other common variables). Crowd sourcing can happen at either the content creator level or at the searching level. At the content creator level, a user may be creating a collection about "antique cars" and will want to see all other collections with that tag or keyword. The content creator can then choose to associate with or collaborate with, all other content creators using the tag "antique cars." Such collaboration can be at the profile level, the collection level or just at the level of a single listing.

While searching, a searcher can also crowd source or associate anything from a profile to a collection to content. When searching for "Little League baseball" a user may want to see the results created by all mothers in Altadena. 52 Or they may wish to see results created by users who are Little League coaches. Or they may wish to see results containing the word "coach," or "leagues." Subsequently, the searcher can decide what to associate and under what parameters. They can then map to display only collections that feature selected words. Using crowd sourcing and enabling users to map content and collections to other content and collections based on multiple and independent parameters empowers a more diversified and more relevant search engine that remains fresh to users on a persistent basis. Users can then freely add to that collection to make a new collection, 53 or comment on that collection, which provides the system with better information as to the relevancy of that content for that particular searcher and uses that intelligence to more effectively serve that collection in the future.

Content Management

Dashboard; Ongoing Ability to Modify

Figure 6:
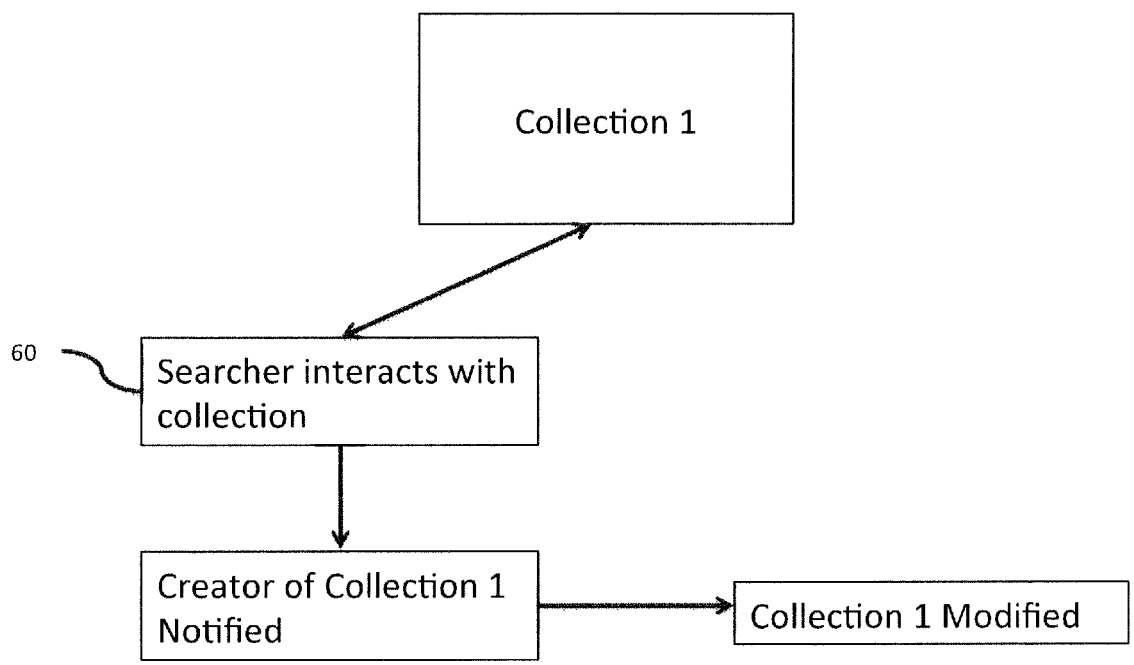
FIG. 6 illustrates an example of how the creator of the collection is notified whenever a searcher interacts with his collection enabling the creator to modify his collection

Referring to FIG. 6, in another embodiment of the disclosure, the creator of the content can view a dashboard that shows which listings or collections have been tagged or associated or modified or otherwise interacted with by other users of the system. Alternatively, in another embodiment of the disclosure, the user can be notified by the server in real time or otherwise each time an event happens with respect to his content or collections. 60 A user will have the ability to manage all of his listings and/or collections from this dashboard. A listing/collection can be modified, deleted, or different tags can be attached to it. Users will be able to associate and disassociate their content and/or collections with other content, listings or collections.

In another embodiment of the disclosure, users who search and find compelling content or collections, can choose to subsequently follow the creator of that content or collection or the collection itself. For example, if a user has created a collection about "Hillary Clinton 2016" and another user follows that collection, that event is stored at the server, and the system will notify the follower each time the creator of the collection makes an update to his/her collection on "Hillary Clinton 2016."

Adding Ad Modules

Figure 7:
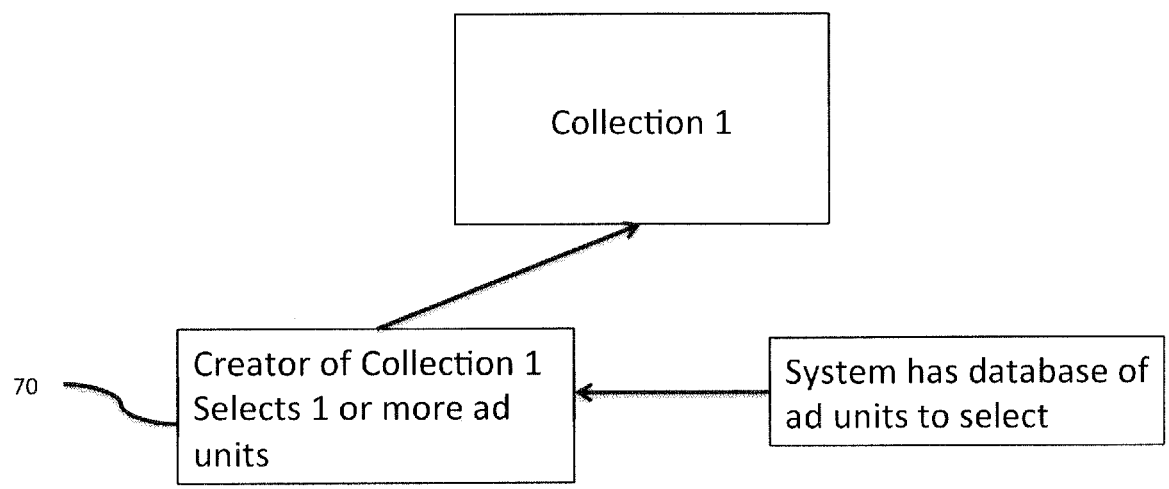
FIG. 7 illustrates an example of how creators of collections can insert system provided ad units into their collection.

Referring to FIG. 7, in addition, in another embodiment of the disclosure, a user can manage any monetization opportunities from this dashboard, including but not limited to, adding, deleting, modifying ad units and/or ad events and/or any of the monetization opportunities discussed within this disclosure within the parameters set by the system. 70

Ranking of Collections

Scoring Resuls/Collections

Another embodiment of the disclosure is the ranking of the results. In one embodiment of the disclosure, results are just a single collection. This collection will appear in response to a query because it is ranked highest in our scoring system for that particular query done by that unique searcher. In another embodiment of the disclosure, the results include multiple collections and are ranked. The collection that appears highest will be the one that is ranked highest in our scoring system for that particular query done by that particular searcher. Our scoring system incorporates many metrics that occur at the browser, application or other interface to a server) including: (i) the frequency of comments, interaction (including but not limited to social sharing) and associations made with such collection; (ii) the frequency (and/or quality) of comments, interaction (including but not limited to social sharing) and associations made with individual listings or media within such collection; (iii) time spent on the page that hosts the collection and/or time spend on the pages the users visit when clicking individual listings; (iv) the return rate among all visitors to our site and separately to that specific collection; (v) the bounce rate, or the rate at which users land on a specific collection and never return to our site. (vi) the feedback, both positive and negative, both qualitative and quantitative, to specific listings within a collection and/or to the collection as a whole; (vii) the number of visits to the specific collection; (viii) the number of clicks on a specific collection; (ix) the number of video views to the extent videos are included in a collection; (x) the origination date of the collection; (xi) the date of the last update to the collection; (xii) the date of the last interaction of any and all types with that collection; (xiii) demographics; (xiv) age; (xv) gender; (xvi) with respect to (xi) through (xv) as it relates to the content creator; (xvii) with respect to (xi) through (xv) as it relates to the searcher; and (xviii) with respect to (xi) through (xv) as the content creator and searcher relate to each other.

In another embodiment of the disclosure, collections will be scored based on the combination of passive and active data. Passive data is data sent to us about a user, without requiring user activity (e.g., their IP address, their operating system, etc.). Active data is provided as a result of user activity at a browser, application or other interface (e.g., a user clicks on a listing, a user performs a search.) It is the combination of active and passive data that will help us determine more information about the user to help provide a likelihood that a certain link or collection of links is relevant to their request. As the performance is scored, the algorithm will incorporate a feedback loop to improve the scoring system for that user and possibly for users sharing certain characteristics with that user, or even for all users. In another embodiment of the disclosure, the data inputted by users will be weighted based on various factors including such user's prior behavior and interaction with the system and such weight will influence the presentation of any collections and/or the listings within any such collection.

Initially, data will be lacking and decisions will be made with less certainty. The matching and ranking algorithms will utilize first summary data (did the listing get a click) until that data can be broken down further as more users use and interact with the system (e.g., did the listing get clicked on by women and ultimately, did the listing get clicked on by women from California that were in the 18-25 age range, . . . etc.) The ability of the system to dig further down in detail to improve matching will improve as more users use the system.

As an example, if the system has two collections that each has recorded one hundred user views, and assume each collection was viewed by both 50 males and 50 females, and each collection had a 70% aggregate click-thru rate ("CTR"). Other systems may view these collections as equal. Our scoring system and matching algorithm will actually calculate the CTR of each collection separately for female users and male users. In analyzing this data, the algorithm may uncover that collection 1 had a CTR of 50% from male users and 90% from female users, and collection 2 may have a CTR of 90% from men and 50% from women. For the next searcher that is a woman, the algorithm will serve collection 1 more prominently as women have been shown to find that collection more relevant. Additional variables will also be taken and the analysis will quickly become multivariable, (e.g., what is the CTR by women who are from the US vs. international women, or international men that are 18-25 years old, etc.) and the role of the algorithm is to continue discerning when there is a material difference in preference and have the systems serve the best match with higher prominence to those types of users.

Viewing Collection Side by Side; Serving Resuls Based on Demographics of Collection Creator In another embodiment of the disclosure, users can view collections side by side and also browse the entire set of collections related to that keyword. In another embodiment of the disclosure, a user can browse not by keyword but by variables of the creator of the collection. If a user is searching for a Santa Monica bakery, the user may only want collections created by people identified or associated with Santa Monica. 51 A collection created by a tourist to Santa Monica will have a different impact on a searcher than a collection created by a resident of Santa Monica.

Displaying Collections Based on User Intent

Another embodiment of the disclosure is a method and system for discerning user intent. Discerning user intent is a longstanding problem for Internet search engines. When a user types in "amazon" the search engine has no way of knowing for certain whether the user is searching for the company or the river. More basically, if different family members search on the same computer for the same query, different results should appear but technology will recognize that computer as one user. Empowering a search engine to offer different sets of results targeted to different users is another embodiment of this disclosure. In another embodiment of the disclosure, the system can enable users to establish intent with either active or passive actions or filters. 51 These results can be displayed instantaneously depending on the targeting parameters used by the searcher.

In another embodiment of the disclosure, the user creating the collection can declare who the collection is best for. A collection on Las Vegas hotels "for families" may be a very different set of results than a collection on Las Vegas Hotels "for spring break" or "for NCAA Tournament." By empowering users to associate their content and collections with a specific target audience (via submitting such association via a browser, interface, application or otherwise to a server that then sorts and serves such results in response to a user query), it helps filter results for the user who comes and searches and can more readily discover content that he/she wants to see at a particular time. This human association, and exchanging of data and feedback with the server, is more powerful than a pure algorithmic system because it is only at the point of sale (or in this case, the point of search) that the user is certain of his intent. His prior behavior may or may not be relevant at that moment in time so an algorithm cannot provide the right direction with certainty. The results that a user wants to see for "Las Vegas hotels" will vary depending on his intent. By enabling users who create collections to target their collections, the system introduces efficiency and increased relevancy into the search system. In another embodiment of the disclosure, the system may modify who the collection is best suited for based on performance data (e.g. click thru rates) and/or other metrics.

In another embodiment of the disclosure, the system can discern user intent based on IP address or the details in his/her profile if logged into the system.

Displaying Collections that Include Data About the Content Creator

In another embodiment of the disclosure, the system can display details about the collection creator through different icons or other representative information, which helps inform the searcher as to the substance of the collection. For example, a searcher may be presented with results that will show several collectors for that keyword. The system may generate a symbol for a "woman" side by side with a symbol for a "shopping cart" which might indicate that the collection was authored by a woman and contains shopping links. Alternatively, the system may generate a symbol for a "man" side by side with a "crossed out shopping cart", which might indicate a man authored the collection of information links. Other examples of symbols could be based on interests, age or location. A symbol based on "proximity" might indicate that the distance between the user (when their location is available) and the author of the content (where they typically reside, if provided) is within a city, county, state, or country. This symbol will be helpful when a user is looking for local businesses or suggestions, even if the user is far from their home.

Display the "Best of the Best"

In another embodiment of the disclosure, the system can aggregate (based on different metrics such as click thru rate, return rate; monetization or other levels of engagement) individual listings within multiple collections and present users with an amalgamation of such results in separate collections in various rankings depending on relevant variable to both the system and the user. 45 In another embodiment of the disclosure, the system can aggregate different content or collections whose relevancy to the search query is still undetermined. The system can attach different headings to these aggregated pieces of content or collections and depending on a user's actions, (including any of the metrics listed under "Scoring Results/Collection" above) deem that content/collections more or less relevant to the search query, thereby improving relevancy and efficiency of the search service for future users of the system as the server will return different results to the user depending on such feedback.

Monetization

Another embodiment of the disclosure is the addition of one or more paid listings within the collection. The paid listing is paid for by an advertiser. In one embodiment of the disclosure, the advertiser only pays for a click on the link when a user otherwise interacts with the collection and the system records such interaction, notifying the server that subsequent actions are monetized. Another event on the page where the ad is presented (e.g. another click, a comment, a view of a video, time spent on the page to indicate active engagement with the site) can assist the system in ascertaining that a click on a paid link or ad in a relevant time period is made with intent to view or otherwise engage with the paid link or ad. This has the added benefit of reducing click fraud (an instance where the click occurs by a bot or a human without any intent of interacting with the destination of such click) and ensuring the click was made by a human being since requiring more than one interaction with a collection will reduce the presence or ability of bots. In one embodiment of the disclosure, the user will have to manually input data as part of their interaction with a collection (and the system records such interaction) to trigger any ability of a subsequent interaction being one that creates a financial transaction. A click will not be counted as a financial event by the system unless it is preceded or accompanied by another such event that informs the system that a human being is conducting the click. This solves the long-standing problem of click fraud within the Internet advertising industry by changing the payment trigger from a cost per click metric to a cost per engagement metric.

In still another embodiment of the disclosure, the initial creator (or what we may call, a curator) of a piece of content is rewarded monetarily or otherwise each time a commercial event happens as a result of a user engaging with such listing or collection. The system records the event, notifying a server on the system of such event so that the curator can receive credit. In yet another embodiment of the disclosure, subsequent curators of that same piece of content may receive some compensation or recognition as well. In each instance, in another embodiment of the disclosure, the creator or curator of the content or collection as the case may be, can request that the system optimize revenue for him/her. The system can then analyze the different advertising opportunities available for that specific collection or content and select the advertisement or advertisements and the appropriate placement for such advertisement(s) within that content or collection to generate the most revenue for the collector/curator of that content and display such content via a browser, application, interface or otherwise. In another embodiment of the disclosure, the user can select what advertisers and/or what advertisements it will or will not accept for its collection or content empowering the user to participate in the ad selection process. In another embodiment of the disclosure, the user can determine the exact placement of the advertisements within his/her collection or within any piece of content that is part of the collection. Placement can be determined by different measurements, including pixel coordinates. The system can attach different monetary values depending on what pixel coordinates are used.

Another embodiment of the disclosure is the ability for the system to designate revenue in alternate forms of currency. Cash, Bitcoin are two options but in addition, the system can offer a user the opportunity to offer discounts via his/her collection to users of his/her collection. A user may do this to increase engagement with his/her collection and may be willing to exchange a higher percentage of revenue for increased volume. In another embodiment of the disclosure, a marketplace can be established between advertisers and users who create collections such that advertisers can determine which curators receive their advertisements and curators can determine which advertisers can appear on their collections or content. This can enable direct pricing exchanges between the advertiser and curator, eliminating the networks that often serve as intermediaries and who do not disclose pricing to their end users.

In another embodiment of the disclosure, advertisers can buy the equivalent of call options for different types of content, collections, categories or keywords. For example, an advertiser may wish to purchase all ad impressions in 2021 on "coffee shop" searches or curated collections about that subject. The system can project future impressions of any keyword based on current run rate, future events and other data stored by the system and attach a projected value for such ad impressions. If they purchase such ad impressions now, they can essentially own those impressions and then use them in 2021 or resell them on the open market to another advertiser. This creates a more fluid marketplace and gives advertisers the ability to benefit from advance purchasing and also benefits the system because it can take in cash earlier for future transactions and create a secondary marketplace for such listings.

In this instance, a marketplace would be established. Prices would be set by the system based on future value and future traffic as well as projected quality of content. Each of these prices would be dynamic, changing based on supply and demand and market expectations. For example, Apple may wish to bid on a term for a product they have in development that is unknown to the world. They could buy that option at a relatively low price as opposed to waiting until the product's release when that price would be exponentially higher. The system can determine which collections and content and keywords could be eligible for this marketplace (or any marketplace the system establishes).

In another embodiment of the disclosure, advertisements appear as closed units that require a separate action. These units can appear within or adjacent to collections or otherwise as part of our service. For instance, a unit may appear on a page that says "ad" or something similar. Interaction with that unit would then open a new window on the user's screen that may display ads in a list or rotation. Users can then interact with ads of their choice. The lack of advertising in the core features of our service may be desirable by users who utilize our services. At the same time, the path to an advertiser is available to users who wish to engage with an advertiser and get offers such advertisers may provide.

What is claimed is:

1. A computer system comprising:
one or more server computers; and
computer readable storage media in communication with the one or more server computers, the computer readable storage media storing instructions that, when executed by the one or more server computers, cause the computer system to:
receive information from one or more collectors defining one or more collections authored by user input from the one or more collectors and defining a target audience for each of the one or more collections which is indicative of intent from the collectors;
receive, from users of a media system accessible over a network, requests for content;
by the one or more server computers, perform a matching algorithm on a collection for the media system over the network, the matching algorithm configured to select for delivery of an appropriate collection to a user requesting content, the matching algorithm including:
analyzing content of the one or more collections, including the defined target audience for the one more collections;
weighting the content for relevancy to one or more target audiences including the defined target audience;
matching, based on the weighted content, one of the target audiences for the collection, the target audience being initially defined by the intent of a collector who authored the user input from the one or more collectors, wherein the target audience includes the user requesting the content and the target audience is dynamically updated based on data collected by the one or more server computers; and displaying responsive content to the user requesting content by selecting individual pieces of content intended by collectors for the target audience including the user requesting the content.

2. The computer system of claim 1 where the matching algorithm incorporates user feedback or known characteristics of the user requesting content, where the known characteristics comprise the user's demographics;
the user's age;
the user's gender;
the user's search history; or
the user's profile.

3. The computer system of claim 1 wherein the matching algorithm is configured to match the target audience defined by the collector with targeting parameters of the user requesting content.

4. The computer system of claim 3 where the matching algorithm incorporates computer data for users of the media system, the computer data comprising:

clicks;
time on page;
time to return;
return rate; or
interactivity with content,
by the users of the media system.

5. The computer system of claim 1 where the matching algorithm incorporates a relationship between the creator that authored the user input and the user requesting content.

6. The computer system of claim 1 where the collection is associated with other collections and the optimization is based on such association.

7. A computer method comprising:

receiving at a server computer a query from a user;
selecting a collection for display to the user, the collection including a group of content items grouped together and ranked in order of preference and associated with a tag by a content owner, the tag usable to indicate an audience for the collection intended by the content owner, the intended audience including the user;
receiving at the server computer requests for advertisements to place alongside or as part of collections in response to the query from the user;
retrieving from an advertiser database a plurality of advertisements;
providing to the server computer that contains the collection the plurality of advertisements;
selecting an advertisement relevant to the collection that is based on the associated tag by the content owner that indicates the audience for the collection, wherein the selected advertisement is displayed to the user in response to the query;
at the server computer, tracking performance of interaction by the user with each piece of content that is part of the collection that is displayed to the user including the advertisement;
recording the performance of the entire selection of content displayed to the user including the advertisement; and
collecting a fee from an advertiser associated with the selected advertisement only after other interaction with content on the page has occurred.

8. An online search method comprising:

receiving, at a user interface module of a server computer, from respective collectors, data defining respective collections, the data including for a respective collection one or more keywords for the respective collection, data defining elements of the respective collection and data defining an intended audience interest for the respective collection as intended by the respective collector;
storing the received data from the respective collectors in a database;
receiving at the user interface module of the server computer a search query from a searcher, the search query including one or more search keywords and data forming an indication of context of interest for the search query as intended by the searcher;
by the server computer, matching the search query with one or more collections stored in the database, including:
  assigning weights to the one or more keywords, the data defining elements, and the intended audience of the respective collection;
  based at least in part on the assigned weights, scoring the respective collection;
  at least in part based on the assigned weights, matching the one or more search keywords of the search query with the one or more keywords for a respective collection;
  matching the indication of context of interest for the search query with the data defining an intended audience interest for the respective collection; and
  updating dynamically an association for the respective collection based on the matching, wherein the association comprises additional collections or keywords that are associated with the respective collection; and
based on results of the matching, providing by the server computer to the searcher the data defining the elements of the respective collection to match the intended audience interest for the respective collection to the indication of context of interest for the search query; and
using the scoring for the respective collection, placing the data defining the elements of the respective collection on a web page and communicating the web page to the searcher.

9. The online search method of claim 8 wherein receiving data defining an intended audience interest comprises receiving data defining an intended target audience.

10. The online search method of claim 8 further comprising:

receiving at the server computer requests for advertisements to place on a web page with the elements of the respective collection in response to the search query from the searcher;
retrieving from an advertiser database a plurality of advertisements;
selecting an advertisement relevant to the respective collection; and
providing to the searcher in response to the search query the data defining the elements of the respective collection and data defining the advertisement.

11. The online search method of claim 8 further comprising:

providing to the searcher details about the respective collector for the respective collection to help inform the searcher as to substance of the respective collection.

12. The online search method of claim 11 wherein providing details about the respective collector comprises providing on a web page symbols based on interests, age, location or distance to a location.

13. The online search method of claim 11 wherein providing details about the respective collector comprises providing on a web page symbols about a local business of the respective collector of the respective collection.

14. The online search method of claim 13 further comprising:
receiving at the server a request for advertisements to place on the web page with the elements of the respective collection in response to the search query from the searcher;
retrieving from an advertiser database a plurality of advertisements;
selecting one or more advertisements relevant to the respective collection or to the search query; and
providing to the searcher, in response to the search query, the data defining the elements of the respective collection, the symbols about the local business of the respective collector of the respective collection, and the one or more advertisements.

15. The online search method of claim 8 wherein data defining respective collections comprises receiving one or more of:
text links to third party content;
audio data or audio links;
image data or links to image files;
video data or links to video files; or
free text.

* * * * *